US012686013B2

(12) United States Patent
Krauss et al.

(10) Patent No.: US 12,686,013 B2

(45) Date of Patent: *Jul. 21, 2026

(54) CRUSHER FOR MINERAL MATERIALS OR RECYCLED MATERIALS

(71) Applicant: Kleemann GmbH, Göppingen (DE)

(72) Inventors: Till Krauss, Rechberghausen (DE); Gerd Meyer, Amstetten (DE); Jochen Meier, Hülben (DE); Steffen Häberle, Herbrechtingen (DE); Rainer Teichert, Haan (DE)

(73) Assignee: Kleemann GmbH, Göppingen (DE)

( * ) Notice: Subject to any disclaimer, the term of this patent is extended or adjusted under 35 U.S.C. 154(b) by 236 days.

This patent is subject to a terminal disclaimer.

(21) Appl. No.: 18/736,689

(22) Filed: Jun. 7, 2024

(65) Prior Publication Data

US 2025/0001430 A1 Jan. 2, 2025

(30) Foreign Application Priority Data

Jun. 28, 2023 (DE) ..................... 10 2023 116 990.4

(51) Int. Cl.

*B02C 25/00* (2006.01)

*B02C 13/06* (2006.01)

(Continued)

(52) U.S. Cl.

CPC .............. *B02C 25/00* (2013.01); *B02C 13/06* (2013.01); *B02C 13/282* (2013.01); *B02C 2013/29* (2013.01)

(58) Field of Classification Search

CPC .......... B02C 13/02; B02C 13/06; B02C 13/09

See application file for complete search history.

(56) References Cited

U.S. PATENT DOCUMENTS 8,844,851 B2 * 9/2014 Solomon ............... B02C 13/095 241/290

10,279,354 B2 * 5/2019 Young ..................... B02C 13/09

(Continued)

FOREIGN PATENT DOCUMENTS

CN 201547360 U 8/2010

DE 4436742 A1 5/1995

(Continued)

OTHER PUBLICATIONS

German Office Action for corresponding Patent Application No. 10 2023 116 990.4, dated Feb. 26, 2024, 12 pages (not prior art).

(Continued)

*Primary Examiner* — Matthew Katcoff

(74) *Attorney, Agent, or Firm* — Lucian Wayne Beavers; Patterson Intellectual Property Law, PC

(57) ABSTRACT

A crusher includes first and second crusher bodies defining a crushing gap. A hydraulic cylinder is coupled to one of the crusher bodies to adjust a width of the crushing gap. A pressure relief valve includes a pressure chamber communicated with the hydraulic cylinder. A pressure relief piston is movable between a closed position and an open position. The pressure relief piston includes at least one piston pressure surface delimiting the pressure chamber in the closed position transversely to the actuation direction of the piston, the pressure relief piston including a surface area at an end facing away from the pressure chamber, which surface area delimits the chamber area transverse to the actuating direction of the piston to transfer a closing force to the pressure relief piston in a closing direction of the closed position when pressure is applied in a chamber area.

16 Claims, 6 Drawing Sheets

(51) Int. Cl.
*B02C 13/282* (2006.01)
*B02C 13/26* (2006.01)

(56) References Cited

U.S. PATENT DOCUMENTS

| | | | | |
|---|---|---|---|---|
| 10,478,823 | B2 | 11/2019 | Sjoberg | |
| 10,596,576 | B2 * | 3/2020 | Rust | B02C 13/00 |
| 10,751,724 | B2 * | 8/2020 | Dallimore | B02C 13/02 |
| 11,779,932 | B2 | 10/2023 | Meyer et al. | |
| 2015/0224508 | A1 | 8/2015 | Jonkka | |
| 2018/0071742 | A1 * | 3/2018 | Grimm | B02C 1/04 |
| 2021/0039107 | A1 * | 2/2021 | Meyer | B02C 25/00 |
| 2021/0370308 | A1 * | 12/2021 | Meyer | B02C 1/005 |

FOREIGN PATENT DOCUMENTS

| | | | |
|---|---|---|---|
| DE | 10015785 | A1 | 10/2001 |
| DE | 102017002079 | B4 | 3/2019 |
| EP | 19541 | B1 | 11/1982 |
| EP | 2774681 | B1 | 5/2016 |
| EP | 3919177 | B1 | 1/2023 |
| WO | 2013101013 | A1 | 7/2013 |

OTHER PUBLICATIONS

European search report in the corresponding patent application No. 24180367.5, dated Jul. 19, 2024, 9 pages (not prior art).

* cited by examiner

CRUSHER FOR MINERAL MATERIALS OR RECYCLED MATERIALS

CROSS REFERENCE TO RELATED APPLICATION

This application claims priority to German Patent Application Ser. No. 10 2023 116 990.4 filed Jun. 28, 2023, which is incorporated herein by reference.

BACKGROUND OF THE DISCLOSURE

Field of the Disclosure

The disclosure relates to a crusher for mineral materials or recycling materials, in particular a rotary impact crusher, jaw crusher, cone crusher or roll crusher, having a crusher unit, which has a first crusher body, in particular a rotor or a crushing jaw, wherein the first crusher body is assigned to a second movable crusher body, in particular an impact rocker or a crushing jaw, wherein a crushing gap is formed between the crusher bodies, wherein a hydraulic cylinder is coupled to one of the crusher bodies, which hydraulic cylinder is disposed and designed to permit a motion of the coupled crusher body, which motion increases the width of the crushing gap in an evasive motion, wherein a pressure space of the hydraulic cylinder is connected to a pressure chamber of a pressure relief valve of an overload triggering device, wherein a piston of the pressure relief valve can be moved between a closed position and an open position, wherein a fluid-conveying connection between the pressure chamber and a pressure equalization area is blocked in the closed position and in the open position the fluid-conveying connection is at least sectionally open, and wherein the piston has at least one piston pressure surface by means of which the piston delimits the pressure chamber in the closed position transversely to the actuating direction of the piston.

Description of the Prior Art

From DE 10 2017 002 079 B4 an impact crusher is known, in which a variable crushing gap is adjusted between a rotatable rotor and an impact rocker. In normal crushing operation, a material feeder is used to feed the material to be crushed to the rotor. The rotor flings the material against the impact rocker. The resulting forces cause the rock material to break. The rock material is thus broken to the desired particle size and can fall out of the crusher housing through the crushing gap. It may however happen that unbreakable bodies are fed into the rotor. For instance, iron parts. This is a critical overload situation for the impact crusher. In particular, there is a risk of damage to the crusher in the process. To render such an overload situation controllable, a piston-cylinder unit is coupled to the impact rocker. It can be used to alter the position of the impact rocker and thus the width of the crushing gap. The piston-cylinder unit includes a gas spring against which the impact rocker rests.

In normal crushing operation, the width of the crushing gap is set to the desired dimension. In the event of a critical overload, the gas spring can be compressed, causing the impact rocker to move out of the way. In this way, the crushing gap can be enlarged in a pulse-like manner. The unbreakable body can then fall through the crushing gap. Subsequently, the width of the crushing gap is re-adjusted to the desired dimension.

The gas spring proposed in DE 10 2017 002 079 B4 introduces elasticity into the support of the impact rocker. During crushing, the forces will vary in a certain permissible degree due to different hardnesses and different sizes of the rocks. In response to these changing forces, the elastic gas spring causes a constant variation of the crushing gap and thus of the grain size of the crushed material, which is undesirable.

From EP 0 019 541 B1 an impact mill is known, in which the crushing gap can be adjusted via a hydraulic cylinder. The hydraulic cylinder has a piston, to which a piston rod is coupled. The piston can be moved in a cylinder space. The piston rod is connected to the impact rocker. An overload valve is provided in case of an overload situation. If a non-crushable body enters the crushing chamber, the overload valve is triggered. It increases the size of the crushing gap and the non-crushable body can fall out of the crushing chamber.

In crushers, in particular in rotary impact crushers, as has already been indicated above, rock material of different size and different hardness is frequently fed into the crusher unit during normal crushing operation. The rotary impact crusher can deal with these rock materials and crush them. In this respect, such an uncritical case has to be distinguished from a critical overload situation, in which a non-crushable body enters the sphere of the crusher unit. The process known from EP 0 019 541 B1 is suitable for slow-running crusher variants. The machine components for setting the crushing gap and the piston rod of the hydraulic cylinder have to be moved to such an extent that the fluid compression creates a chamber pressure that triggers the pressure relief valve. It is obvious that the setting pressure of the pressure relief valve may not be too low, as otherwise normal crusher loads would cause the crushing gap to become misaligned, which would result in a significant reduction in the quality of the end material. Fast-running crusher variants require the crushing gap to open quickly. Accordingly, the pressure relief valve has to be able to react quickly and at the same time be sufficiently dimensioned to limit the pressure increase caused by the rapidly accelerating machine components for setting the crushing gap.

Further crushers having overload triggering devices are known from EP 3 919 177 B1 (U.S. Pat. No. 11,779,932) and EP 2 774 681 B1 (U.S. Pat. No. 10,478,823).

SUMMARY OF THE DISCLOSURE

The disclosure addresses the problem of providing a crusher of the type mentioned above, in which the overload triggering device responds quickly in the event of an overload and at the same time the crushing gap is kept as constant as possible during normal operation.

This problem is solved by the piston having a surface area at its end facing away from the pressure chamber, which surface area, in the closed position of the piston, delimits a chamber area transverse to the actuating direction of the piston to transfer a closing force into the piston in the direction of the closed position when pressure is applied in the chamber area.

In the closed position of the piston, an opening force acts in the opening direction of the piston. The opening force is computed from the pressure in the pressure chamber and from the effective piston pressure surface delimiting the pressure chamber, onto which piston pressure surface this pressure is applied. A closing force acts in the closing direction of the piston. The closing force is computed from the pressure in the chamber area and from the area of the surface area delimiting the chamber area onto which surface area the pressure in the chamber area is applied. In other words, the closing force can be used to compensate for at least part of the opening force. This allows the piston to be designed to be particularly light, resulting in a small mass to be moved. In this way, a pressure relief valve that can open quickly in the event of an overload is created. This enables the pressure relief valve to respond quickly in the event of an overload. Advantageously, the ratio of the mass (in grams) of the piston to the nominal opening surface (in $mm^2$) can be selected in the range from 0.03 to 0.15. The nominal opening surface is the surface that encompasses the circumferential surface of the valve seat against which the piston rests in the closed position.

Preferably provision is made for the pressure in the chamber area to be lower in the closed position than in the pressure chamber.

It is further preferable for the pressure of a hydraulic fluid to be applied both in the pressure chamber and in the chamber area, i.e., a hydraulic fluid is filled into the pressure chamber and the chamber area.

The chamber area is particularly preferably connected to a chamber of the hydraulic cylinder, which accommodates the piston rod of the hydraulic cylinder (rod end of the hydraulic cylinder). In particular, provision may be made for a pressure regulator to be assigned to the rod end of the hydraulic cylinder, which is provided and designed to readjust the pressure at the rod end of the hydraulic cylinder when the hydraulic cylinder piston of the hydraulic cylinder is moved.

A preferred variant of the disclosure is such that a pressure equalization surface is indirectly or directly connected to the piston of the pressure relief valve, which is held outside the pressure chamber in an external pressure area, and that the pressure equalization surface is designed and disposed to transfer a closing force into the piston in the direction of the closed position when pressure is applied in the external pressure area. This measure provides additional support to the closing force. An additional closing force, which acts in the closing direction, is computed from the pressure applied to the pressure equalization surface and from the size of the pressure equalization surface.

For instance, provision may be made for the pressure in the external pressure area to be lower than the pressure in the pressure chamber in the closed position of the piston and for the external pressure area to be in air-conveying contact with the environment, i.e., atmospheric pressure is present there. This results in a simple design using little assembly effort and few parts. Alternatively, the pressure of a hydraulic fluid can act on the pressure equalization surface in the closed position of the piston. To this end, provision may be made for the pressure in the external pressure area to be lower than the pressure in the pressure chamber. However, the pressure in the pressure chamber can also be greater than or equal to the pressure in the external pressure area.

Preferably, provision is made for the chamber area to be spatially separated from the external pressure area.

By appropriately selecting the size of the piston pressure surface, which delimits the pressure chamber, the size of the surface area, which delimits the chamber area, and the size of the pressure equalization surface, to which the pressure is applied in the external pressure surface, the closing force can be influenced in a targeted manner, while at the same time resulting in a lightweight design of the piston.

This solution can be used to downsize the piston pressure surface(s) and thus the effective surface(s), via which a force is applied to move the piston to trigger the pressure relief valve compared to the solutions known from the state of the art. Accordingly, lower forces are required to move the piston in the event of an overload. In this way, controllable forces on the piston that can be easily absorbed outside the pressure chamber of the pressure relief valve to keep the pressure relief valve in the closed position during normal crusher operation result. This design also reduces the mass of the piston and thus the accelerated components of the pressure relief valve. This further improves the response behavior in the event of an overload.

A structurally simple design results if provision is made for an actuator, in particular a piston rod, to be connected to the piston, which piston rod forms the pressure equalization surface outside the pressure chamber. If the piston rod is guided through the chamber area and connected to the piston, the cross-section of the piston rod also reduces the effective surface area in the chamber area such that this surface area can be specifically influenced via the cross-section of the piston rod.

If provision is made for a spring, in particular a mechanical spring, to act directly or indirectly on the piston, which spring applies a closing force to the piston in the closing direction in the closed position of the piston, then the crushing gap is kept as constant as possible in normal operation (i.e., when there is no overload) of the crusher. By suitably dimensioning the spring, the closing force can be influenced in such a way that an overload event is unintentionally triggered when hard rock material has to be broken in the crushing chamber.

A compact design can be implemented for the pressure relief valve if provision is made for the spring to be disposed in the external pressure area, in particular inside the cylinder of the pressure relief valve.

If provision is made for the pressure equalization surface to be formed by a pressure piece of the piston and for the spring to be supported on the pressure piece, then the spring force can be transferred directly via the piston, which increases functional reliability. It is preferable for the pressure piece to have a sector protruding radially outwards beyond the pressure equalization surface, on which sector the spring is supported, such that a good support and force transfer for the spring are achieved.

In a particularly preferred design variant of the disclosure provision is made in the closed position of the piston of the pressure relief valve, for the pressure of a hydraulic fluid to act on the surface area, wherein preferably provision is made for the pressure in the chamber area to be lower than the pressure in the pressure chamber.

In addition, provision may be made for the chamber area of the pressure relief valve to be connected in a hydraulically conductive connection to a chamber of the hydraulic cylinder, which chamber accommodates a piston rod of the hydraulic cylinder and in which chamber a hydraulic fluid is held. The chamber can also be referred to as the rod end of the hydraulic cylinder. Including the rod end in the overload triggering device initially reduces the design effort, as no oil has to be returned separately. If a pressure regulator is assigned to the rod end, which pressure regulator readjusts the pressure in the chamber, an adaptive pressure relief valve is created. During normal operation of the crusher, i.e., when there is no overload situation, the pressure relief valve is able to compensate for fluctuations in the crushing force occurring in the crushing gap. If harder rock material enters the crushing gap, the hydraulic cylinder piston of the hydraulic cylinder and in conjunction therewith the piston rod is moved. As the pressure regulator adjusts the pressure at the rod end, the piston of the pressure relief valve remains in the closed position. This prevents any unintentional triggering of the pressure relief valve. The pressure relief valve can therefore adapt to different load situations. If, on the other hand, the hydraulic cylinder piston is moved quickly in the event of an overload, the pressure regulator no longer readjusts the pressure at the rod end. A pressure drop then results in triggering the pressure relief valve.

To prevent the piston of the pressure relief valve from tilting in its cylinder, provision may be made for the surface area of the pressure relief valve to form an annular surface, which preferably extends concentrically around the actuator, in particular around the piston rod.

A stable guidance of the actuator, in particular of the piston rod, in the cylinder of the pressure relief valve can be achieved in a simple manner by the actuator, in particular the piston rod, extending through the chamber area in the closed position of the piston, wherein preferably provision is made for the chamber area to be delimited by a piston guide at a distance from the piston, wherein the piston guide has an aperture through which the actuator, in particular the piston rod, is guided in a sealed manner by means of a guide surface.

To be able to quickly and effectively reduce the pressure in the pressure chamber of the pressure relief valve in the event of an overload, provision may be made for the piston of the pressure relief valve to have a piston head to which the actuator, in particular the piston rod, is coupled, preferably integrally connected, and wherein the piston head can be moved from its closed position into the chamber area, and wherein preferably provision is made for the piston head to be at least partially guided past at least one outflow opening during its motion from the closed position into the open position or a partially open position to establish a hydraulically conductive connection between the pressure chamber and the pressure equalization area.

In a further development of the disclosure, provision may be made for a relief piston to be movably guided inside the chamber area of the pressure relief valve, wherein the relief piston can be moved between a closed position and an open position, wherein a fluid-conveying connection between the pressure chamber and a pressure equalizing area is blocked in the closed position and the fluid-conveying connection is at least sectionally released in the open position, in that the relief piston has at least one piston pressure surface by means of which the relief piston delimits the chamber area in the closed position transversely to the actuating direction of the relief piston, and in that the piston and the relief piston open consecutively as a result of an increase in pressure in the hydraulic cylinder. If the piston of the pressure relief valve opens to relieve pressure in the event of an overload, this solution renders achieving additional pressure relief via the relief piston possible. This is particularly advantageous if the pressure in the pressure equalization area is still relatively high after the piston has opened, which pressure can then be reduced by opening the relief piston into the pressure equalizing area. For instance, the pressure equalizing area can be connected to a tank, into which excess hydraulic oil is drained.

It is conceivable that for this purpose the pressure equalization area is connected to the rod end of the hydraulic cylinder. Excess oil, which, owing to the smaller volume caused by the piston rod of the hydraulic cylinder at the rod end, cannot be accommodated in the event of an overload, can then be discharged into the tank via the pressure equalizing area.

The response behavior of such a pressure relief valve can be improved in that, in the closed state of the relief piston, the projection of the piston pressure surface or the piston pressure surfaces of the relief piston into a projection plane transverse to the actuating direction of the relief piston only delimits part of the chamber area transverse to the actuating direction of the relief piston.

BRIEF DESCRIPTION OF THE DRAWINGS

The disclosure is explained in greater detail below based on exemplary embodiments shown in the drawings. In the figures.

DETAILED DESCRIPTION

Figure 1:
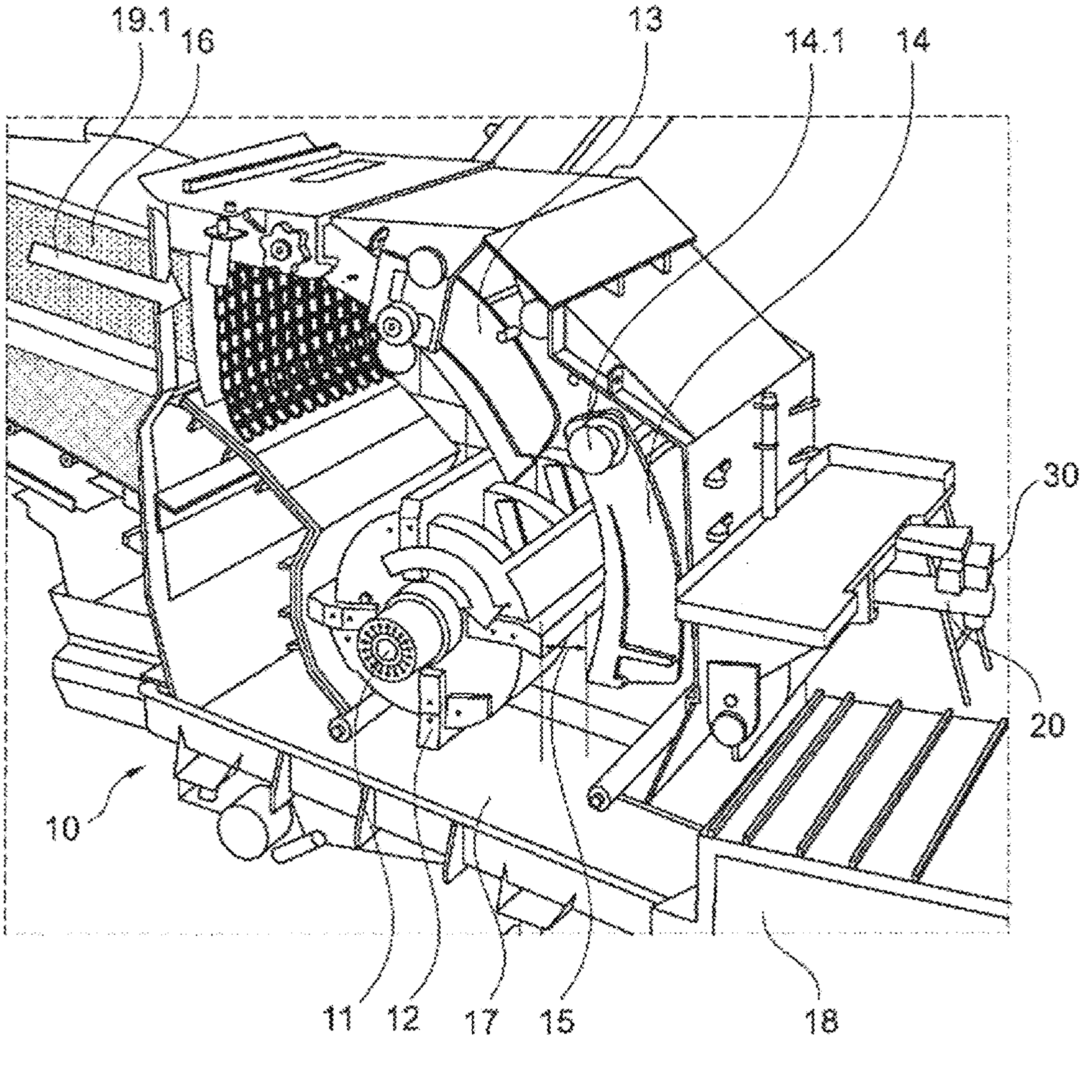
FIG. 1 shows a perspective schematic diagram of a crusher unit of a rotary impact crusher with connected machine components of the crusher.

FIG. 1 shows a crusher unit 10 of a rotary impact crusher. The crusher unit 10 comprises a crusher housing, in which a movable crusher body 11 is rotatably mounted. Accordingly, the movable crusher body 11 is designed as a rotor. The rotor bears impact bars 12 in the area of its outer circumference.

An upper impact rocker 13 is disposed inside the crusher housing. Furthermore, a further crusher body 14 is also disposed in the crusher housing, which in this case forms a lower impact rocker.

A crushing gap 15 is formed between the rotor (crusher body 11) and the lower impact rocker (crusher body 14). When the rotor rotates, the radially outer ends of the impact bars 12 form an outer crushing circle. This crushing circle, in conjunction with a facing surface of the lower impact rocker, forms the crushing gap 15. A swivel bearing 14.1 is used to swivel mount the lower impact rocker 14. The width of the crushing gap 15 can be adjusted via the selected swivel position of the lower impact rocker.

Figure 2:
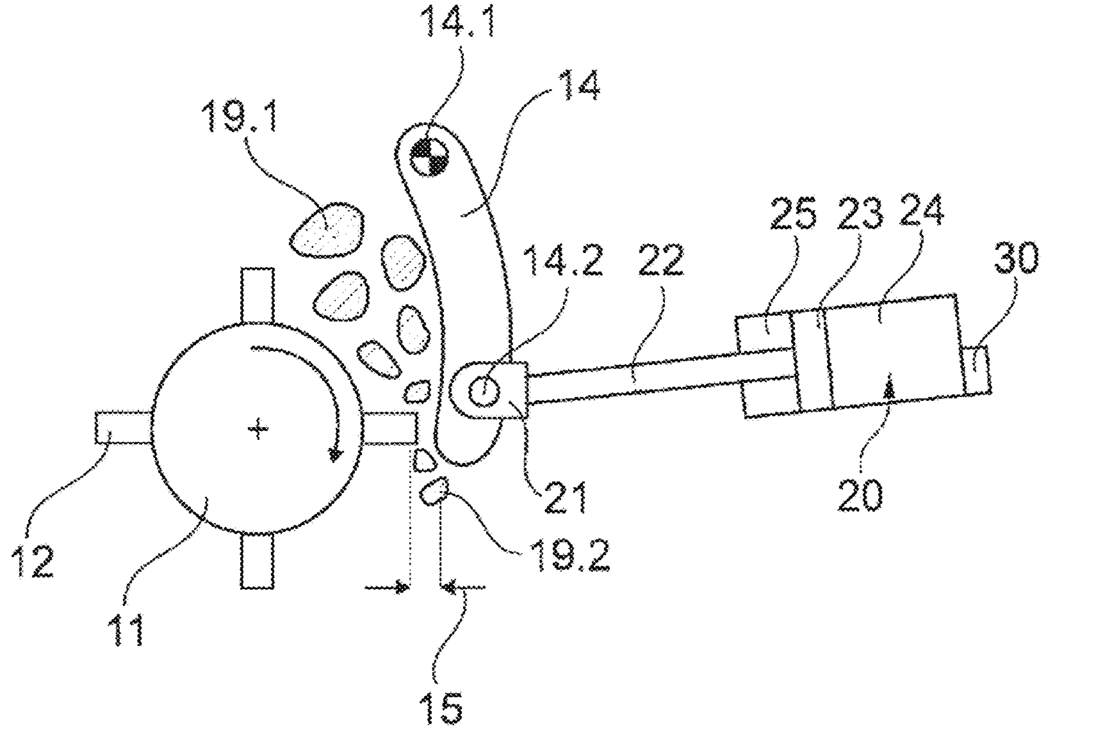
FIGS. 2 and 3 show a schematic representation of the crusher unit according to FIG. 1 having an overload triggering device.

As FIG. 1 further shows, a material feed 16 can be assigned to the crusher unit 10. This material feed 16 can be used to convey material 19.1 to be crushed into the crushing chamber. The conveying direction is symbolized by an arrow in FIG. 1. When the material 19.1 to be crushed enters the area of the crusher body 11, the impact bars 12 fling it outwards. In this process, this material hits the upper impact rocker 13 and the lower impact rocker 14. The material to be broken 19.1 is crushed when an impact bar 12 or the two impact rockers 13, 14 hit(s) material to be crushed in the crushing chamber This is shown for the lower impact rocker 14 in more detail in FIGS. 2 and 3 by way of example. When the material to be crushed 19.1 hits the crusher body 14, crushed material 19.2 is produced, as shown in FIG. 2. As soon as this crushed material 19.2 has a grain size smaller than the crushing gap 15, this crushed material 19.2 falls through the crushing gap 15. Then it enters a collection area 17 below the movable crusher body 11 (rotor). As FIG. 1 shows, a conveyor 18 is connected to the collection area 17. This conveyor 18 can be used to remove the crushed material 19.2.

As FIG. 2 further shows, an actuator in the shape of a hydraulic cylinder 20 is used to support the crusher body 14 relative to the machine structure of the crusher. The support at the machine structure, for instance at the machine frame of the crusher, is not detailed in the drawings. However, FIG. 1 shows that the hydraulic cylinder 20 is installed in a protected manner mainly outside the crusher housing in which the rotor is mounted.

Figure 3:
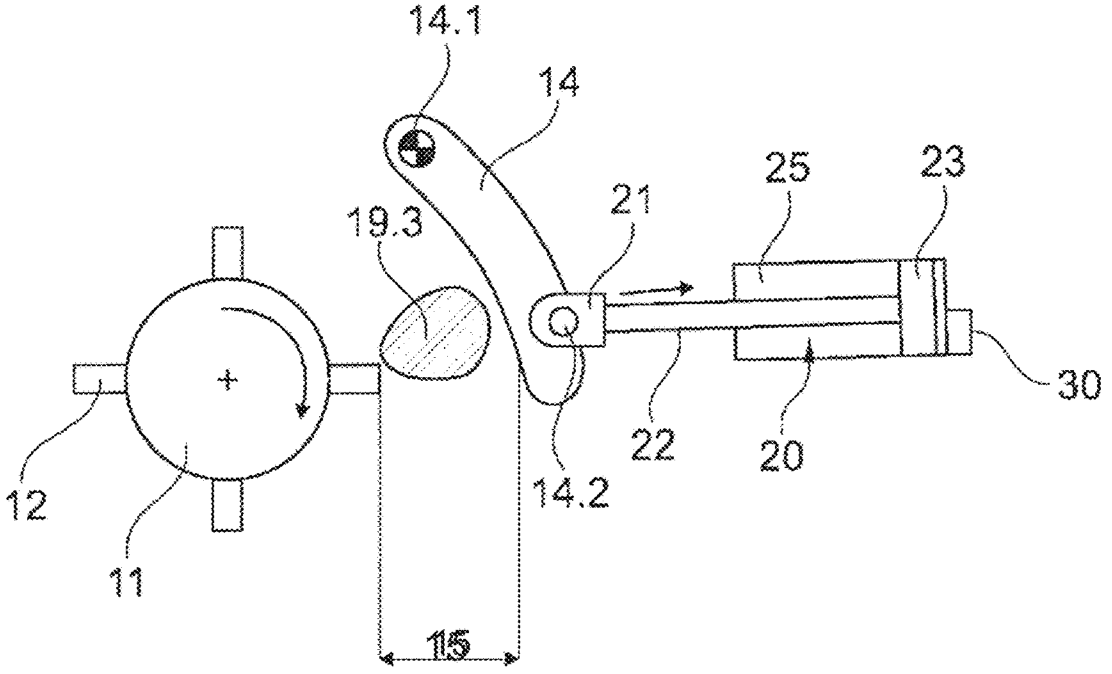

As shown in FIGS. 2 and 3, the hydraulic cylinder 20 has a cylinder 25, in which a piston 23 of a hydraulic cylinder is movably guided. The piston 23 of the hydraulic cylinder bears a piston rod 22. The piston rod 22 is equipped with a coupling piece 21 at its end facing away from the piston 23 of the hydraulic cylinder, which coupling piece comprises a bearing part. This bearing part is used to connect the coupling piece 21 to a bearing 14.2 of the crusher body 14. In this way, the hydraulic cylinder 20 is swivel mounted to the crusher body 14. The coupling point is at a distance from the swivel bearing 14.1.

As FIG. 2 shows, the piston 23 of the hydraulic cylinder delimits a pressure space 24 in the cylinder 25. Hydraulic fluid, in particular hydraulic oil, is filled into the pressure space 24. The piston 23 of the hydraulic cylinder is supported against this medium. In this way, the piston rod 22 and the crusher body 14 are held in the predetermined crushing position shown in FIG. 2.

Depending on the crushing task at hand, the operating position of the crushing gap 15 has to be set accordingly. The crusher has a control device for this purpose. If, starting from the position shown in FIG. 2, the crushing gap 15 is to be widened, hydraulic fluid is drained from the pressure space 24. This causes the piston 23 of the hydraulic cylinder to move further into the cylinder 25 until the desired crushing gap 15 has been set. On the other hand, if a narrower crushing gap 15 is desired, additional hydraulic fluid is added to the pressure space 24. This moves the piston 23 of the hydraulic cylinder while enlarging the pressure space 24. The piston rod 22 continues to move out of the cylinder 25. This causes the crusher body 14 to swivel clockwise, resulting in a narrowing of the crushing gap 15.

As FIGS. 2 and 3 show, an overload triggering device 30 is used. The overload triggering device can either be connected directly to the hydraulic cylinder 20 or installed separately therefrom at the machine end.

The disclosure can also be implemented on a different type of rock crusher, for instance on a jaw crusher, a cone crusher or a roll crusher.

In a jaw crusher, the crusher unit has a fixed crushing jaw 11 as the first crusher body and a crusher body 14 opposite therefrom in the form of a movable crushing jaw. The fixed and movable crushing jaws are aligned at an oblique angle to each other such that a shaft tapering conically towards a crushing gap 15 is formed between them. The movable crushing jaw is driven, for instance, by an eccentric.

The eccentric is used to move the movable crushing jaw towards and away from the stationary crushing jaw in an elliptical motion. In the course of such a stroke, the distance between the crushing jaws also changes. The motion of the movable crushing jaw causes the material 19.1 to be crushed to be broken further and further along the conical shaft until it reaches a grain size that allows it to exit the shaft through the crushing gap 15. The broken material 19.2 falls onto a crusher discharge belt, which is used to convey it along. The movable crushing jaw can be supported relative to the machine frame by means of an actuator 20, which can take the form of a hydraulic cylinder 20, for instance. The hydraulic cylinder 20 can, for instance, be designed in the manner described above. An overload triggering device 30 can then be coupled to the hydraulic cylinder 20.

Figure 4:
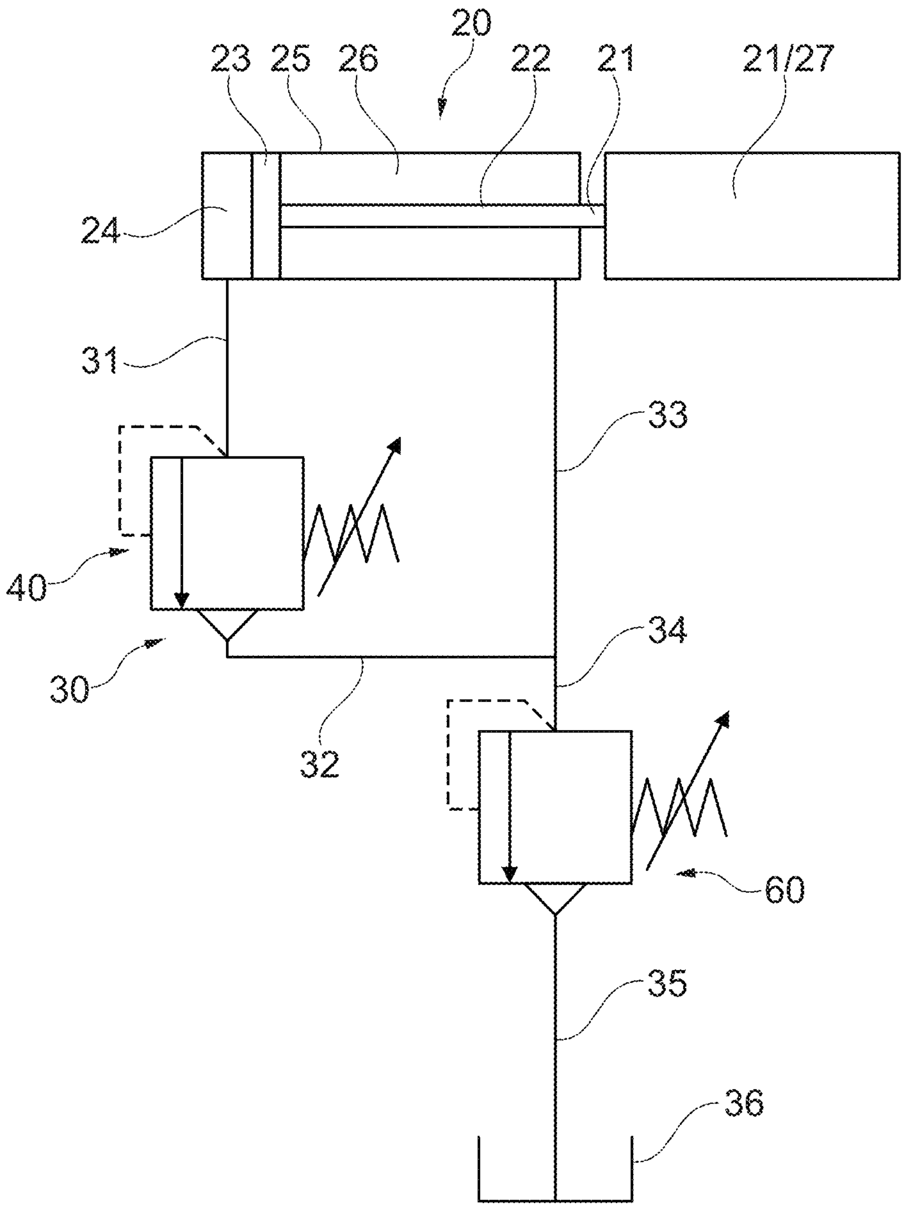
FIG. 4 shows a schematic representation of the overload triggering device.

FIG. 4 illustrates a design variant of an overload release device 30. The illustration again shows the hydraulic cylinder 20 in conjunction with the hydraulic cylinder piston 23 guided inside the cylinder 25, which piston is coupled to the piston rod 22. The piston rod 22 has been moved out of the cylinder 25. The piston rod 22 is disposed in a chamber 26 of the cylinder, which forms the rod end of the hydraulic cylinder 20. Outside the cylinder 25, a transmission device 27 is used to couple the piston rod 22 to the crusher body 14. In the simplest case, the coupling piece 21 can form transmission device 27.

The pressure space 24 of the hydraulic cylinder 20 is connected to a pressure relief valve 40 via a pressure line 31. The chamber 26 (rod end) of the hydraulic cylinder 20 is hydraulically connected to a pressure relief valve 60 via a return line 33.

Figure 5:
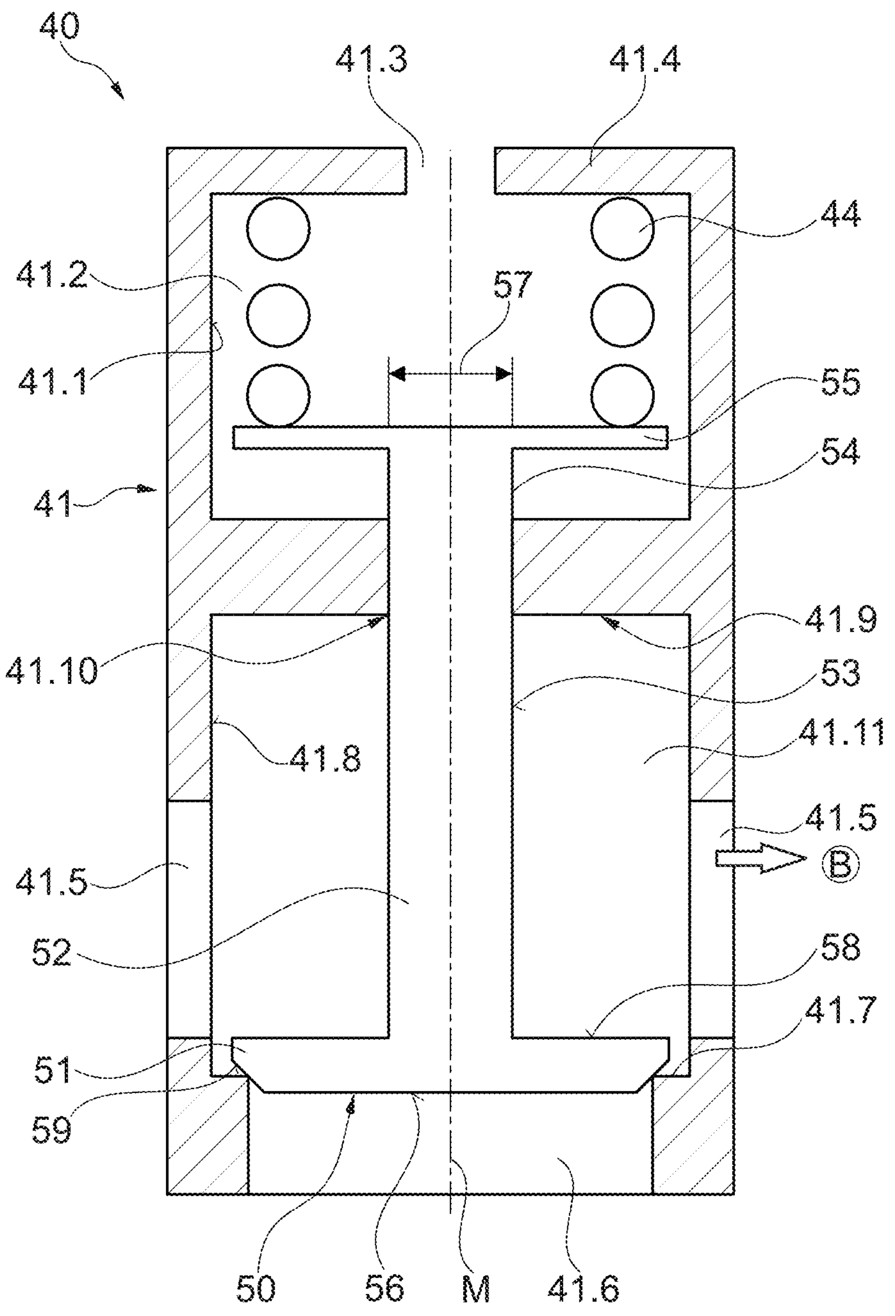
FIG. 5 shows a schematic representation of a pressure relief valve of the overload triggering device.

With reference to FIG. 5, a possible design variant of a pressure relief valve 40 is explained below. As this diagram illustrates, the pressure relief valve 40 has a cylinder 41 having a cylinder wall. The cylinder wall 41 may be referred to as a pressure relief cylinder 41. A cylinder base 41.4 is coupled to this cylinder wall. The cylinder wall forms an inner cylinder wall 41.1. The cylinder base 41.4 has at least one passage 41.3. However, it is also conceivable that such a passage 41.3 is provided in the cylinder wall. The passage 41.3 can be used to connect an external pressure area 41.2 to the environment. The external pressure area 41.2 forms a space in the cylinder 41.

FIG. 5 illustrates that the external pressure area 41.2 is delimited by the cylinder base 41.4 and an inner cylinder wall 41.1 of the cylinder 41. Furthermore, a piston guide 41.9 delimits the external pressure area 41.2 at the end facing away from the cylinder base 41.4. A spring 44 is disposed in the external pressure area 41.2. As illustrated in the drawing, the spring 44 can be designed as a coil spring. However, it is also conceivable that another mechanical spring, for instance a disk spring or a combination of mechanical spring elements, forms the spring 44.

A piston 50 is disposed in the interior of the cylinder 41. The piston 50 of the pressure relief valve 40 may be referred to as a pressure relief piston 50 to distinguish the same from the piston 23 of the hydraulic cylinder 20. The piston 50 has a pressure piece 55. This pressure piece 55 is used to support the piston 50 against the spring 44. Furthermore, the spring 44 may be supported on the cylinder base 41.4 or at any other suitable point in the cylinder 41.

FIG. 5 shows that the piston 50 may comprise a piston head 51. A piston rod 52 is connected to the piston head 51, preferably integrally molded thereto. The piston rod 52 may be referred to as a pressure relief piston rod 52 to distinguish the same from the piston rod 22 of the hydraulic cylinder 20.

As FIG. 5 shows, the piston rod 52 may have a cylindrical outer contour.

The piston rod 52 is linearly guided on the piston guide 41.9 in the cylinder 41 along the central longitudinal axis M of the cylinder 41. Possibly, the piston rod 52 has an outer guide surface 53, which is preferably formed by the cylindrical outer contour of the piston rod 51. The guide surface 53 is guided through an aperture 41.10 of the piston guide 41.9 in a sealed manner and in the aperture 41.10.

According to FIG. 5, a chamber area 41.11 can be formed inside the cylinder 41, separated from the external pressure area 41.2. Preferably, the piston guide 41.9 can be used to delimit the chamber area 41.11 at its end facing the cylinder base 41.4 to achieve a compact design.

Radially on the outside, the chamber area 41.11 is advantageously delimited by an inner wall 41.8 of the cylinder wall. At its end facing away from the cylinder base 41.4, the piston head 51 can be used to close off the chamber area 41.11 in the closed position of the piston 50 shown in FIG. 5. For this purpose, a surface area 58 of the piston head 51 delimits the chamber area 41.11 at the end facing away from the piston base 41.4.

As FIG. 5 shows, the cylinder wall of the cylinder 41 may have at least one outflow opening 41.5. This outflow opening 41.5 establishes a conductive connection between a pressure equalization area B and the chamber area 41.11.

In the closed position shown in FIG. 5, a valve surface 59 of the piston head 51 rests on a valve seat 41.7 of the cylinder 41 in a sealed manner.

Advantageously, in the closed position shown in FIG. 5, a piston pressure surface 56 of the piston head 51 delimits a pressure chamber 41.6. The piston pressure surface 56 may adjoin the valve seat 41.7.

The pressure chamber 41.6 is connected to the pressure space 24 of the hydraulic cylinder 20 via the pressure line 31 and is connected thereto in fluid-conveying manner.

In the closed position shown in FIG. 5, the piston pressure surface 56, which delimits the pressure chamber 41.6 transversely to the actuating device of the piston 50, is the surface of the piston 51 to which the pressure in the pressure chamber 41.6 is applied in the closed position of the pressure relief valve 40. This surface is designed and disposed to transfer an opening force into the piston 50 in the direction of the opening position (from bottom to top in FIG. 5) when pressure is applied in the pressure chamber 41.6. The surface of this piston pressure surface 56 projected in the direction of the central longitudinal axis M in a projection plane generates the opening force in the direction of the central longitudinal axis M in conjunction with the pressure in the pressure chamber 41.6.

Further surface portions of the piston 50, which are not suitable for transferring an opening force into the piston 50, are not piston pressure surfaces 56 in terms of the disclosure.

The surface area 58, which delimits the chamber area 41.4 transversely to the actuating direction of the piston 50, is in terms of the disclosure the surface which is formed and disposed in order to transfer a closing force into the piston 50 in the direction of the closed position (in FIG. 5 from top to bottom) when pressure is applied in the chamber area 41.11. The surface of this surface area 58 projected in the direction of the central longitudinal axis M in the projection plane generates the closing force acting in the direction of the central longitudinal axis M interacting with the pressure in the chamber area 41.11.

Further surface portions of the piston 50, which are not suitable for transferring a closing force into the piston 50, are not surface areas 58 of the piston 50 in terms of the disclosure.

FIG. 5 illustrates that an adjusting piece 54 is used to guide the piston 50 into the external pressure area 41.2. In the external pressure area, the adjusting piece 54 forms a pressure equalization surface 57. The pressure equalization surface 57 forms a surface that delimits the external pressure area 41.2 transverse to the actuating direction of the piston 50.

The pressure equalization surface 57 is designed and disposed to transfer a closing force into the piston 50 in the direction of the closed position (from top to bottom in FIG. 5) when pressure is applied in the external pressure area 41.2. The surface of this pressure equalization surface 57 projected in the direction of the central longitudinal axis M in the projection plane generates a closing force acting in the direction of the central longitudinal axis M interacting with the pressure in the external pressure area 41.2. There are clearly recognizable further surface areas on the pressure piece 55. However, these are not suitable for transferring a closing force into the piston 50 and can therefore not be taken to be a pressure equalization surface 57.

The pressure relief valve 40 is connected in the overload triggering device 30 in such a way that the pressure space 24 of the hydraulic cylinder 20 is in fluid-conveying connection with the pressure chamber 41.6.

The chamber area 41.11 is in fluid-conveying connection with the rod end 26 of the hydraulic cylinder via the return line 33.

Advantageously, the external pressure area 41.2 is in contact with the surrounding atmosphere, i.e., atmospheric pressure is present there.

During normal crushing operation, i.e., when there is no overload situation, the pressure relief valve 40 is in the closed position shown in FIG. 5.

In the event of an overload, the pressure in the pressure space 24 of the hydraulic cylinder 20 increases abruptly as a result of the piston rod 22 entering the cylinder 25 of the hydraulic cylinder 20. This pressure is then also present at the pressure chamber 41.6. This causes the piston 50 to move out of the closed position shown in FIG. 5 against the preload of the spring 44 and to release the valve seat 57. This allows the hydraulic fluid to pass from the pressure chamber 41.6 via the outlet opening 41.5 into the pressure equalization area B.

This relieved hydraulic fluid is routed to the rod end 26 of the hydraulic cylinder 20 via the line section 32 and the return line 33. Excess hydraulic fluid that cannot be absorbed at the rod end 26 is routed into the tank 36 via the manifold 34 and a pressure relief valve 60 that then opens. After the overload event has ended, this hydraulic fluid from the tank 36 can be used to refill the pressure space 24. The hydraulic cylinder piston 23 is then returned to its initial position and the hydraulic cylinder 20 is thus returned to its operating position.

When the pressure in the pressure chamber 41.6 has dropped, the spring 44 returns the piston 50 of the pressure relief valve 40 to the closed position shown in FIG. 5.

Figure 6:
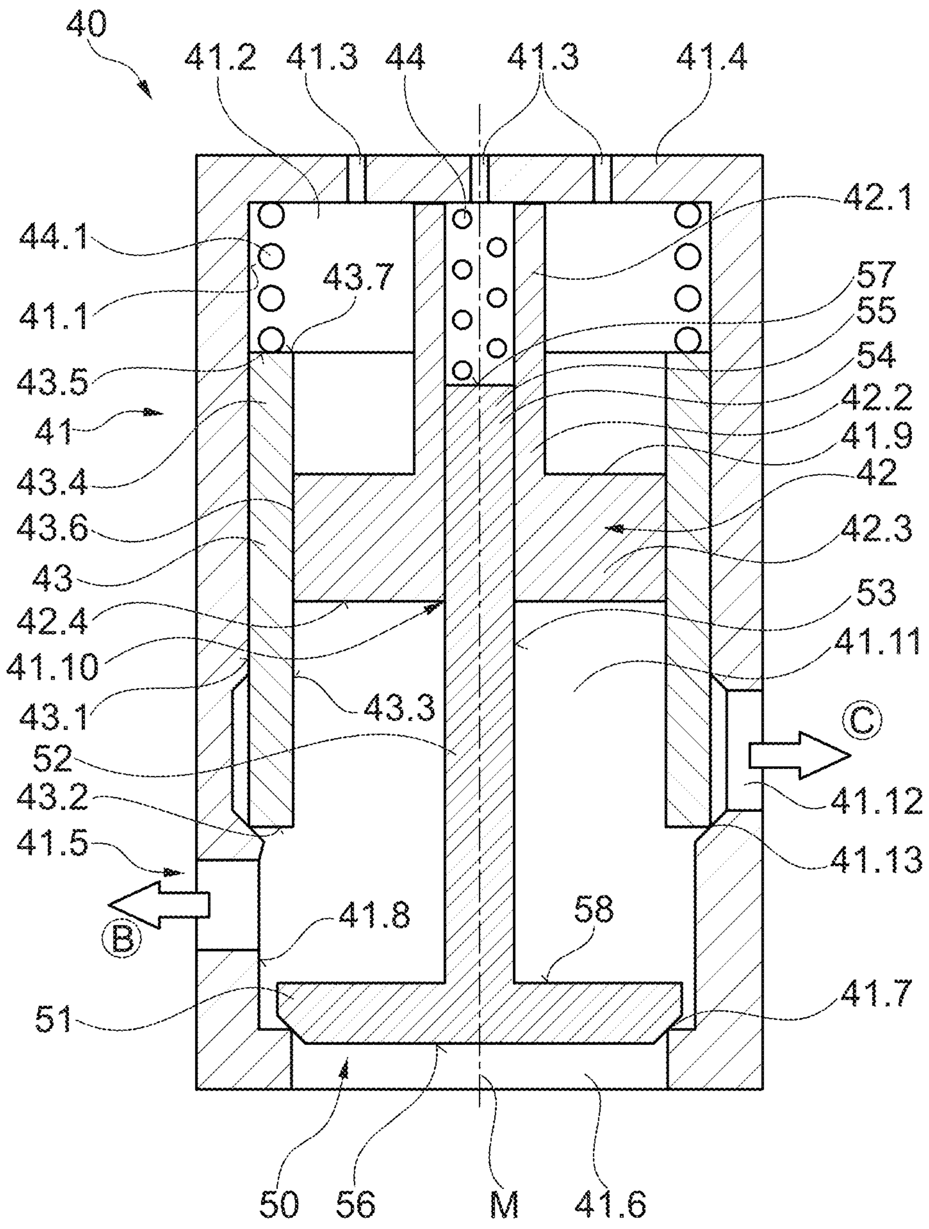
FIG. 6 shows a schematic representation of a further exemplary embodiment of a pressure relief valve of the overload triggering device and FIG. 7 shows a schematic representation of a further design variant of the disclosure.

FIG. 6 shows a further design variant of a pressure relieve valve 40 according to the disclosure. This pressure relief valve 40 combines the functionalities of the pressure relief valve 40 shown in FIG. 5 and the pressure relief valve 60 shown in FIG. 4.

In FIG. 6, the same reference symbols are assigned to the same components as in FIG. 5, such that reference can be made to the above explanations to avoid repetition. The differences between the two design variants of a pressure relief valve as shown in FIGS. 5 and 6 are therefore explained below.

As FIG. 6 shows, again a cylinder 41 having a cylinder base 41.4 and cylinder wall is used. The spring 44, which supports the piston 50, is disposed in the external pressure area 41.2. In this exemplary embodiment, a connecting section 42.1 separates the external pressure area, which accommodates the spring 44. The area in which the spring 44 is accommodated is in turn connected to the environment via at least one passage 41.3. The remaining space of the external pressure area 41.2 is also connected to the environment via at least one passage 41.3. A further spring 44.1 is also disposed here.

Preferably, the connecting section is part of a bridging device 42 disposed in the cylinder 41, which forms the piston guide 41.9. The bridging device 42 again separates the chamber area 41.11 from the external pressure area 41.2.

In contrast to the exemplary embodiment shown in FIG. 5, the bridging device 42 does not cover the entire cross-sectional area of the interior of the cylinder 41. In fact, a relief piston 43 is disposed between the radially outer circumference of the bridging device 42 and the inner cylinder wall 41.1. This relief piston can be designed as a cylindrical sleeve, as shown in this exemplary embodiment. The relief piston 43 may be referred to as an annular relief piston 43.

To guide the relief piston 43, the bridging device 42 has a head 42.3, which can be integrally connected to the connecting section 42.1 via a carrier 42.2.

The head 42.3 is provided radially on the outside with a guide, at which the relief piston 43 is guided in a sealed manner by means of a guide surface 43.6. Radially on the outside, the relief piston 43 has an outer wall 43.1, which is guided in a sealed manner on the inner cylinder wall 41.1.

The relief piston 43 can be designed in such a way that it partially delimits the chamber area 41.11 with an inner wall. In the closed state shown in FIG. 6, the inner wall 43.3 covers a fluid outlet 41.12. The fluid outlet 41.12 can be connected to the tank 36 via a connection line (not shown).

FIG. 6 further illustrates that a support section 43.4 of the relief piston 43 can be inserted into the external pressure area 41.2. The supporting section 43.4 has an actuating section 43.5. The relief piston 43 uses this actuating section 43.5 as support on the further spring 44.1. The further spring 44.1 is supported relative to the cylinder base 41.4 or another component of the cylinder 41, wherein the further spring 44.1 applies a preload to the relief piston 34 in the direction of the closed position shown in FIG. 6.

In the closed position, the relief piston 43 is held in a sealed manner on a further valve seat 41.13 of the cylinder 41, as shown in FIG. 6. In this closed state, the relief piston 43 seals the connection between the fluid outlet 41.12 and the chamber area 41.11.

In the area of the support section 43.4, the relief piston 43 has at least one relief pressure surface 43.7, and a piston pressure surface 43.2 is provided on the relief piston 43 facing the chamber area 41.11. Preferably, the piston pressure surface 43.2 and/or the relief pressure surface 43.7 are designed as circumferential, annular surfaces. Preferably, these two surfaces are the same, i.e., have the same surface area.

The pressure in the chamber area 41.11 acts on the piston pressure surface 43.2. The pressure of the external pressure surface 41.2 presses against the relief pressure surface 43.7.

The piston pressure surface 43.2 of the relief piston 43, which delimits the chamber area 41.4 transversely to the actuating direction of the relief piston 50, can be designed and disposed as shown to transfer an opening force into the relief piston 43 in the direction of the opening motion (from bottom to top in FIG. 5) when pressure is applied in the chamber area 41.11. The surface of this piston pressure surface 43.2 projected into the projection plane in the direction of the central longitudinal axis M generates the opening force acting in the direction of the central longitudinal axis M in conjunction with the pressure in the chamber area 41.11.

As shown in the drawings, the relief pressure surface 43.7, which delimits the external pressure area 41.2 transversely to the actuating direction of the relief piston 50, can be designed and disposed to transfer a closing force into the relief piston 43 in the direction of the closed position (from top to bottom in FIG. 5) under the action of the pressure in the external pressure area 41.2. The surface of this relief pressure surface 43.7 projected into the projection plane in the direction of the central longitudinal axis M generates the closing force acting in the direction of the central longitudinal axis M in conjunction with the pressure in the external pressure area 41.2.

During the normal operation of the crusher described above, the pressure relief valve 40 is in the closed position shown in FIG. 6.

In the event of an overload, the piston head 51 of the piston 50 is moved into the chamber area 41.11 against the preload of the spring 44. This opens the connection between the pressure chamber 41.6 and the pressure equalization area B (see above). If the pressure on the relief piston 43 exceeds the closing forces acting thereon, the relief piston 43 also opens and releases the connection between the chamber area 41.11 and the pressure equalizing area C. Then, the hydraulic fluid can flow out of the chamber area 41.11 into the tank 43.

If the closing forces exceed the opening forces again after the overload event has ended, the relief piston 43 and the piston 50 close and return to the closed position shown in FIG. 6.

Figure 7:
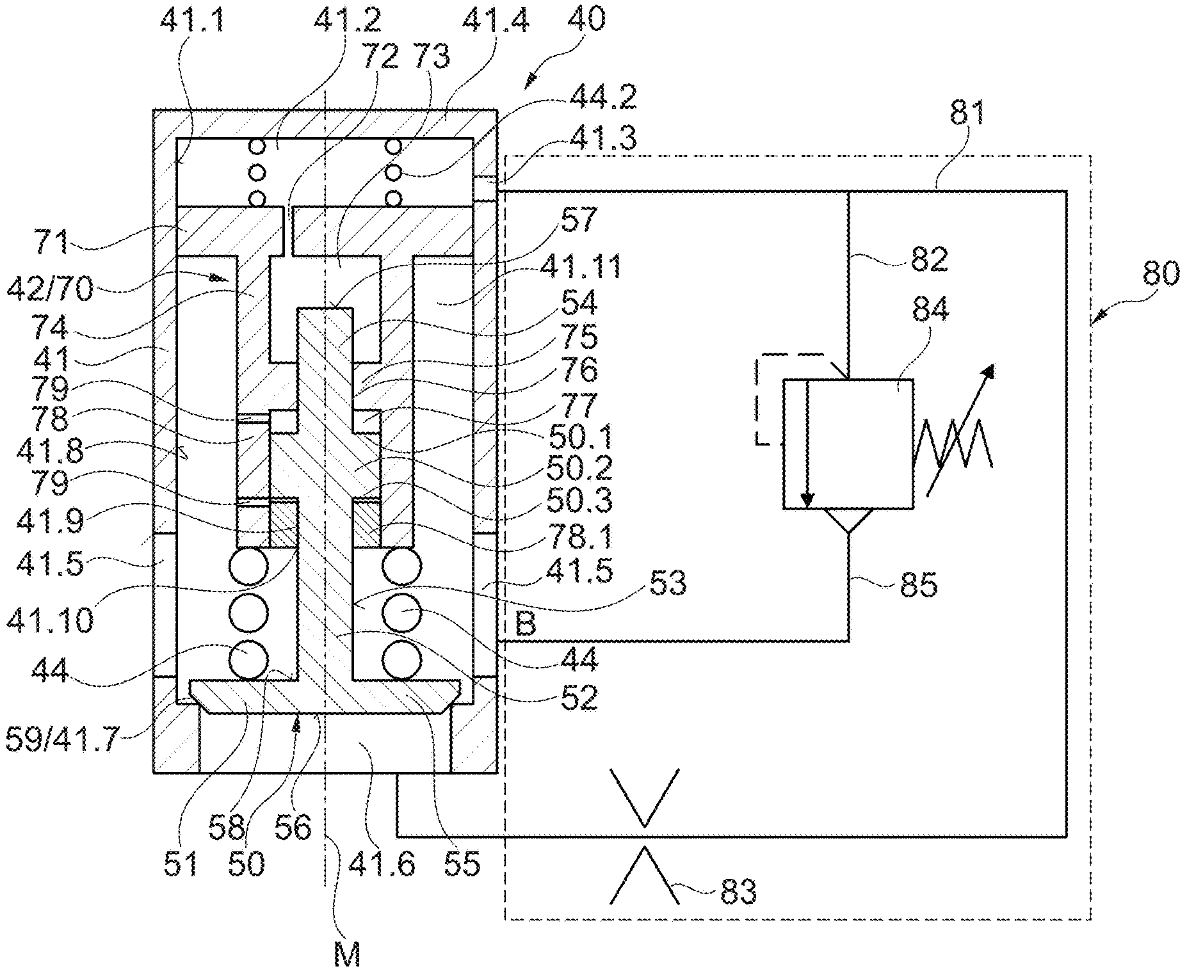

FIG. 7 shows a further design variant of the disclosure. Identical components have been provided with the same reference signs, which is why reference can be made to the above explanations to avoid repetitions.

As the illustration shows, a pressure relief valve 40 having a cylinder 41 is used. The cylinder 41 again has an inner cylinder wall 41.1.

An external pressure area 41.2 is assigned to the cylinder 41. The external pressure area 41.2 is spatially connected to a reversing hydraulic system 80.

The cylinder 41 has a chamber area 41.11, which has at least one outlet opening 41.5. A piston 50 is movably disposed inside the cylinder 41. In the closed position shown in FIG. 6 a valve surface 59 of the piston 50 rests against a valve seat 41.7 of the cylinder 41. The inner wall 41.8 forms a sliding surface, at least sectionally, on which a bridging device 42 is movably guided.

The bridging device 42 can, for instance, be formed by or have a control piston 70, as shown in FIG. 7.

The bridging device 42, which can be designed in particular in the form of a control piston 70, is movably guided inside the cylinder 41. For this purpose, the control piston 70 or the bridging device 42 has a head 71, which is sealed on its outer circumference and guided on the inner wall 41.8 of the cylinder 41, which is designed as a sliding surface.

The control piston 70 has a chamber 73, which is spatially connected to the external pressure area 41.2 via at least one passage 72.

As FIG. 7 shows, the control piston 70 may have a connecting section 74 that protrudes into the chamber area 41.11. In particular, the connecting section 74 can extend into the chamber area 41.11 in the direction of the central longitudinal axis. The connecting section 74 may form the chamber 73 at least sectionally.

The control piston 70 can have a guide 75, which can be formed in particular by an aperture 76. The guide 75 accommodates a piston rod 52 of the piston 50, wherein the piston rod 52 can be coupled directly or indirectly to the piston 50. Preferably, the piston 50 is sealed in the aperture 76.

According to a possible design variant, the control piston 70 can form a mount 77. A stop piece 50.2 of the piston 50 is accommodated in this mount 77. The stop piece 50.2 may have a first stop 50.1 and a second stop 50.3. The stops 50.1 and 50.3 are used to delimit the motion of the piston 50 relative to the control piston 70. Counter-stops are disposed on the control piston 70 for this purpose. One of the counter-stops may be formed by a removable cover 78.1, which allows the piston 50 to be mounted on the control piston 70. The cover 78.1 may form a piston guide 41.9.

As the drawings show, the mount 77 may be delimited by a circumferential wall 78 of the control piston 70.

The mount 77 may be connected to the chamber area 41.11 via passages 79. The passages 79 are disposed on both sides of the stops 50.1, 50.3, as FIG. 7 clearly shows.

The control piston 70 is preloaded in the direction of the closed position of the valve by means of a support spring 44.2. The support spring 44.2 may be disposed in the external pressure area 41.2. The support spring 44.2 may be supported on a cylinder base 41.4 of the cylinder 41 and rest against the opposite head 71 of the control piston 70, as shown in FIG. 7.

FIG. 7 illustrates that the piston 50 may have the stop piece 50.2 in the area of the piston rod 52.

As can be seen from FIG. 7, the piston 50 may have an adjusting piece 54 that is guided through the aperture 76 into the external pressure area 41.2. In this exemplary embodiment, the pressure piece 54 is guided into the area of the chamber 73. The chamber 73 forms part of the external pressure area 41.2 via the passage 72.

The pressure piece 54 again forms a pressure equalization surface 57. The piston 50 has a piston pressure surface 56, which delimits a pressure chamber 41.6 in the closed state shown in FIG. 7. The pressure chamber 41.6 is spatially connected to the pressure chamber 24 of the hydraulic cylinder 20 (or, if necessary, to the chamber 26). Opposite from the pressure chamber 41.6, the piston 50 forms a surface area 58. This surface area 58 delimits the chamber area 41.11 in the closed state according to FIG. 7, as shown in FIG. 7.

The piston 50 is spring-preloaded against the control piston 70 by means of the spring 44. In the closed position of the piston 50, the spring element 44 applies a preload in the direction of the central longitudinal axis, which preload presses the valve surface 59 of the piston 50 against the valve seat 41.7.

As shown in the drawings, the reversing hydraulics 80 may be spatially connected to the external pressure area 41.2 via a control line 81. For this purpose, it can be connected to the at least one passage 41.3. The control line 81 is connected to the pressure chamber 41.6 or is connected thereto in a spatial manner. An orifice 83 or a restrictor can be installed in the control line 81.

A branch 82 then leads from the control line 81, which branch is spatially connected to the chamber area 41.11 via a line section 85, for instance connected to the outlet opening 41.5.

A valve 84 is integrated into the valve 40. This valve 84 can be designed as a pressure relief valve, which opens when a limit pressure is reached and clears the way to route hydraulic fluid from the passage 41.3 to the chamber area 41.11.

In an alternative design variant, the line section 85 may not be connected to the chamber area 41.11, but to an external space, where, for instance, ambient pressure is present and which space may, for instance, be in the form of a tank. This allows the external pressure area 41.2 to be relieved within a short time when the valve 84 is actuated, as there is only a small counter pressure.

During normal crushing operation, the pressure of the pressure space 24 of the hydraulic cylinder 20 is applied to the pressure chamber 41.6. This pressure is also present in the external pressure area 41.2, via the connecting control line 81. The spring 44 and the support spring 44.2, which can be connected in series as in this case, support the closing force that holds the piston 50 in the closed state shown in FIG. 7.

If the crushing forces increase within permissible limits during the crushing operation, the pressure in the pressure space 24 of the hydraulic cylinder 20 increases. Accordingly, the pressures in the external pressure area 41.2 or in the chamber 73 also increase via the control line 81. The piston 50 is held in the closed position up to a certain limit pressure, supported by the spring 44 or the support spring 44.2.

If the crushing forces now increase sharply during crushing operation due to an overload situation, the spring 44 is compressed and the piston 50 is lifted off the valve seat 41.7. The hydraulic fluid in the pressure chamber 41.6 flows into the pressure equalization area B. The moving masses of the piston 50 and the spring 44 can be kept low, as the valve stroke of the mechanism consisting of piston 50 and spring 44 is kept relatively small. This allows the pressure relief valve 40 to open quickly in the event of an overload. In particular, the spring 44 can be designed to be light-weight, because in this embodiment the spring stroke of the spring 44 relative to the cylinder base 41.4 can be designed to be smaller in relation to the piston stroke of the piston 50 relative to the cylinder base 41.4.

Owing to the displacement of the piston 50 in the event of an overload, an additional load builds up on the control piston 70 via the spring 44. In addition, the pressure in the pressure chamber 41.6 is now also present in the chamber area 41.11 as a result of the open piston 50. If this pressure in the chamber area 41.11 is now greater than a predetermined limit pressure, the control piston is also moved following the motion of the piston 50. The movement is made against the preload of the support spring 44.2. As a result of the movement of the control piston 70, the opening area towards the pressure equalization area B is enlarged for a larger quantity of hydraulic fluid to be able to flow into the pressure equalization area B within a short time.

When the control piston 70 is moved, hydraulic fluid is displaced from the external pressure area 41.2 into the branch 82. If an actuating pressure is exceeded at the valve 84, the valve 84 opens and the hydraulic fluid can then flow out, resulting in a movement of the control piston 70.

When the control piston 70 is moved, it slides along the inner wall 41.8, which can be designed as a sliding surface and against which the control piston 70 is guided in a sealed manner.

After the overload situation has ended, the spring 44 and the support spring 44.2 return the piston 50 or the control piston 70 to the initial position shown in FIG. 7.

The invention claimed is:

1. A crusher for mineral materials or recycling materials, comprising:
   - a first crusher body:
   - a movable second crusher body arranged such that a crushing gap is formed between the first and second crusher bodies;

a hydraulic cylinder coupled to one of the crusher bodies and configured to permit an evasive motion of the coupled one of the crusher bodies to increase a width of the crushing gap, the hydraulic cylinder including a pressure space; and a pressure relief valve including:

a pressure chamber communicated with the pressure space of the hydraulic cylinder;

a chamber area communicated with a pressure equalization area exterior of the pressure relief valve;

a pressure relief piston movable in an actuating direction between a closed position and an open position, wherein a fluid-conveying connection between the pressure chamber and the pressure equalization area is blocked in the closed position and is at least partially open in the open position; and the pressure relief piston including at least one piston pressure surface delimiting the pressure chamber in the closed position transversely to the actuating direction of the piston, the pressure relief piston including a surface area at an end facing away from the pressure chamber, which surface area delimits the chamber area transverse to the actuating direction of the piston to transfer a closing force to the pressure relief piston in a closing direction of the closed position when pressure is applied in the chamber area.

2. The crusher of claim 1, wherein the pressure relief valve further comprises:

an external pressure area; and a pressure equalization surface connected directly or indirectly to the pressure relief piston and located outside of the pressure chamber in the external pressure area, the pressure equalization surface being configured to transfer a closing force to the pressure relief piston in the closing direction of the closed position when pressure is applied to the external pressure area.

3. The crusher of claim 2, wherein the pressure relief valve further comprises:

a pressure relief piston rod connected to the pressure relief piston, the pressure equalization surface being defined on the pressure relief piston rod.

4. The crusher of claim 2, wherein:

the external pressure area is in air-conveying communication with an environment surrounding the pressure relief valve, and in the closed position of the pressure relief piston a pressure in the external pressure area is lower than a pressure in the pressure chamber.

5. The crusher of claim 2, wherein:

the hydraulic cylinder includes a piston rod and a piston rod chamber receiving the piston rod of the hydraulic cylinder; and the external pressure area is hydraulically connected to the piston rod chamber of the hydraulic cylinder.

6. The crusher of claim 1, wherein the pressure relief valve further comprises:

a mechanical spring acting directly or indirectly on the pressure relief piston to apply a closing force to the pressure relief piston in the closing direction in the closed position of the pressure relief piston.

7. The crusher of claim 6, wherein the pressure relief valve further comprises:

a pressure relief cylinder defining an external pressure area within the pressure relief cylinder; and wherein the mechanical spring is located inside the pressure relief cylinder in the external pressure area.

8. The crusher of claim 6, wherein:

the pressure relief piston includes a pressure piece located outside of the pressure chamber in the external pressure area, the pressure piece having a pressure equalization surface defined thereon to transfer a closing force to the pressure relief piston in the closing direction of the closed position when pressure is applied to the external pressure area, and the pressure piece including a radially outer portion protruding radially outwards beyond the pressure equalization surface, the mechanical spring being supported on the radially outer portion of the pressure piece.

9. The crusher of claim 1, wherein:

the hydraulic cylinder includes a piston rod and a piston rod chamber receiving the piston rod of the hydraulic cylinder; and the chamber area of the pressure relief valve is hydraulically communicated with the piston rod chamber, whereby in the closed position of the pressure relief piston the pressure of hydraulic fluid in the chamber area acts on a surface area of the pressure relief piston to force the pressure relief piston in the closing direction.

10. The crusher of claim 9, wherein:

the surface area forms an annular surface extending concentrically around a piston rod of the pressure relief piston.

11. The crusher of claim 1, wherein the pressure relief valve further comprises:

a piston guide spaced from the pressure relief piston and partially delimiting the chamber area, the piston guide having an aperture therethrough; and a piston rod extending from the pressure relief piston and guided in a sealed manner through the aperture of the piston guide, the piston rod extending through the chamber area in the closed position of the pressure relief piston.

12. The crusher of claim 1, wherein the pressure relief valve further comprises:

at least one outflow opening communicated with the chamber area; and the pressure relief piston including a piston head and a piston rod integrally connected to and extending from the piston head, the piston head being movable during opening movement of the pressure relief piston past the at least one outflow opening to establish a hydraulically conductive connection between the pressure chamber and the pressure equalization area outside of the pressure relief valve.

13. The crusher of claim 1, wherein the pressure relief valve further comprises:

a pressure relief cylinder; and a movable control piston received in the pressure relief cylinder, the pressure relief piston being movably disposed in the movable control piston.

14. The crusher of claim 1, wherein the pressure relief valve further comprises:

at least one outflow opening communicated with the chamber area;

an annular relief piston movably guided within the chamber area between a closed position blocking the at least one outflow opening and an open position wherein the at least one outflow opening is open, the annular relief piston including a piston pressure surface delimiting the chamber area in the closed position transversely to an actuating direction of the annular relief piston; and wherein the pressure relief piston and the annular relief piston open consecutively as a result of an increase in pressure in the hydraulic cylinder communicated to the pressure chamber of the pressure relief valve.

15. The crusher of claim 14, wherein:

in the closed position of the annular relief piston a projection of the piston pressure surface of the annular relief piston in a projection plane transverse to the actuating direction of the annular relief piston delimits only a part of the chamber area transversely to the actuating direction of the annular relief piston.

16. The crusher of claim 15, wherein the pressure relief valve further comprises:

a bridging device including at least one pressure surface section delimiting the chamber area in the actuating direction of the annular relief piston, the annular relief piston being movable relative to the bridging device, the bridging device including at least one pressure surface section delimiting the chamber area in the actuating direction of the annular relief piston, wherein a projection of the at least one pressure surface section in the actuating direction of the annular relief piston onto the projection plane does not completely cover the projected piston pressure surface of the annular relief piston.

* * * * *